(12) United States Patent
Hibino et al.

(10) Patent No.: US 10,247,263 B2
(45) Date of Patent: Apr. 2, 2019

(54) SELECTABLE ONE-WAY CLUTCH

(71) Applicant: TOYOTA JIDOSHA KABUSHIKI KAISHA, Toyota-shi, Aichi-ken (JP)

(72) Inventors: Akira Hibino, Susono (JP); Hiroyuki Shibata, Odawara (JP); Yuki Kurosaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 236 days.

(21) Appl. No.: 15/229,773

(22) Filed: Aug. 5, 2016

(65) Prior Publication Data

US 2017/0037914 A1 Feb. 9, 2017

(30) Foreign Application Priority Data

Aug. 7, 2015 (JP) .................................. 2015-157686

(51) Int. Cl.
*F16D 23/12* (2006.01)
*F16D 41/12* (2006.01)

(52) U.S. Cl.
CPC ...... *F16D 41/125* (2013.01); *F16D 2023/123* (2013.01)

(58) Field of Classification Search
CPC .................... F16D 41/125; F16D 2023/123
See application file for complete search history.

(56) References Cited

U.S. PATENT DOCUMENTS

| 7,766,790 B2* | 8/2010 | Stevenson ............... B60K 6/365 |
| | | 192/43.1 |
| 8,540,065 B2* | 9/2013 | Samie ................... F16D 41/084 |
| | | 188/82.2 |
| 9,482,297 B2* | 11/2016 | Brubaker ................ F16D 41/16 |
| 9,702,419 B2* | 7/2017 | Essenmacher ........ F16D 41/125 |
| 2010/0200358 A1* | 8/2010 | Eisengruber ............ F16D 41/12 |
| | | 192/41 S |

(Continued)

FOREIGN PATENT DOCUMENTS

| JP | 2003-021220 A | 1/2003 |
| JP | 2008-014333 A | 1/2008 |
| JP | 2008-082478 A | 4/2008 |

OTHER PUBLICATIONS

U.S. Appl. No. 15/194,930, filed Jun. 28, 2016 (not yet published).
(Continued)

*Primary Examiner* — David J Hlavka
(74) *Attorney, Agent, or Firm* — Hunton Andrews Kurth LLP

(57) ABSTRACT

A selectable one-way clutch includes: a pocket plate; a notch plate; an annular selector plate; an arm; and an actuator. An operating shaft is configured to move the arm along a circumferential direction of the selector plate so as to move the arm to an engagement position and to a non-engagement position. The operating shaft includes a slope portion inclined relative to a direction of a tangential line to the outer circumference of the selector plate. The slope portion is configured to move the selector plate to a position farther apart from the notch plate in a case where the arm is located at the non-engagement position than a position from the notch plate in a case where the arm is located at the engagement position.

6 Claims, 6 Drawing Sheets

(56) References Cited

U.S. PATENT DOCUMENTS

| | | | |
|---|---|---|---|
| 2010/0252384 A1* | 10/2010 | Eisengruber | F16D 41/125 |
| | | | 192/35 |
| 2011/0183806 A1* | 7/2011 | Wittkopp | F16D 7/028 |
| | | | 475/263 |
| 2012/0090952 A1* | 4/2012 | Lee | F16D 41/08 |
| | | | 192/41 R |

OTHER PUBLICATIONS

U.S. Appl. No. 15/168,579, filed May 31, 2016 (not yet published).
U.S. Appl. No. 15/198,584, filed Jun. 30, 2016 (not yet published).

\* cited by examiner

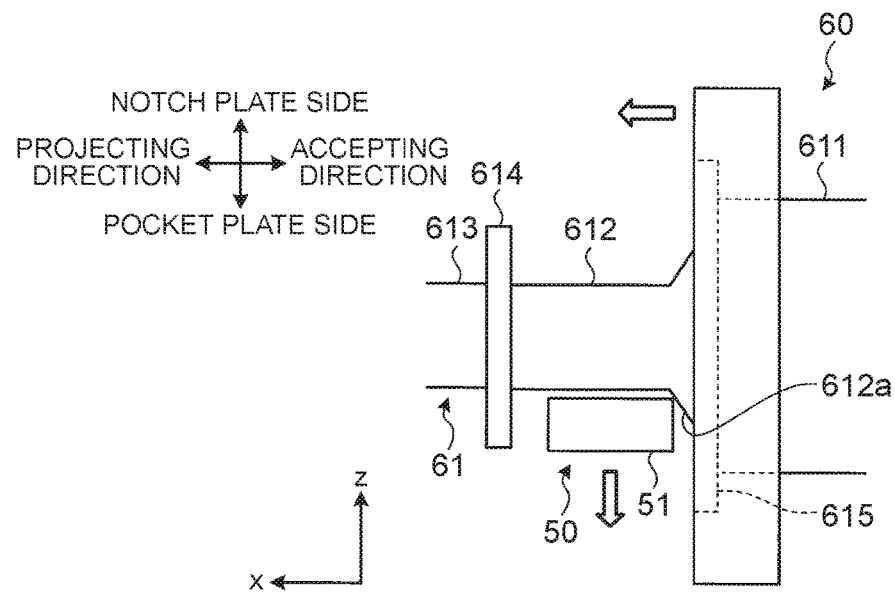
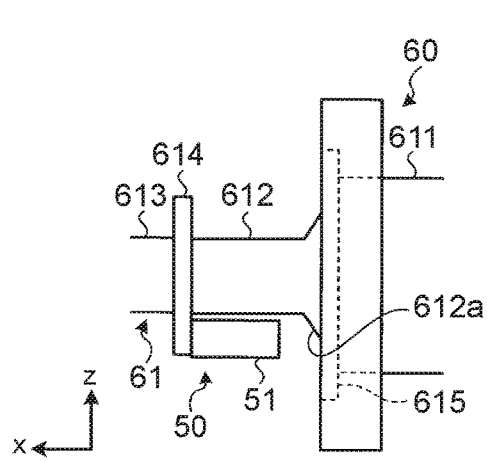
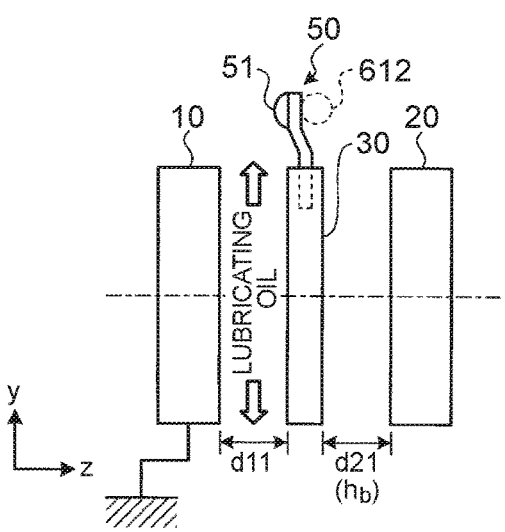

SELECTABLE ONE-WAY CLUTCH

INCORPORATION BY REFERENCE

The disclosure of Japanese Patent Application No. 2015-157686 filed on Aug. 7, 2015 including the specification, drawings and abstract is incorporated herein by reference in its entirety.

BACKGROUND

1. Technical Field

The present disclosure relates to a selectable one-way clutch.

2. Description of Related Art

As one-way clutches, there have been known selectable one-way clutches capable of switching states of struts (engagement pieces) of pocket plates and notches (engagement recesses) of notch plates between an engagement state and a non-engagement state through selector plates disposed between the pocket plates and notch plates. In such selectable one-way clutches, the selector plates relatively slide against the pocket plates or the notch plates; therefore, a lubricating oil is supplied to sliding surfaces among these plates so as to secure a smooth movement among the components.

For example, in Japanese Patent Application Publication No. 2003-021220, there is proposed an apparatus configured such that, in a stator used in a torque converter of an automatic transmission or the like, recesses and oil passages communicating with the respective recesses are formed in a surface of a stator body that faces a notch plate, thereby supplying the lubricating oil to the sliding surfaces of the stator body and the notch plate.

The respective plates of the selectable one-way clutch are configured to be rotated relative to each other; therefore, for example, if the notch plate is rotated relative to the fixed pocket plate, torque is applied via the lubricating oil onto the selector plate disposed between the pocket plate and the notch plate. Such a torque is a dragging action caused by a shear force derived from viscosity of the lubricating oil, and a greater torque (dragging torque) acts as the viscosity of the lubricating oil becomes higher.

A common selectable one-way clutch is configured such that an arm is coupled to a selector plate, and the arm is moved by an actuator including a return spring so as to carry out switching between the engagement state and the non-engagement state. For example, no torque is required to be transmitted before an engine start up, and thus the arm is held to be urged by an elastic force of the return spring in a manner as to put the pocket plate and the notch plate in the non-engagement state.

SUMMARY

Unfortunately, if the lubricating oil of the selectable one-way clutch has an extremely low temperature at the engine start-up time, the selector plate is rotated by the aforementioned dragging torque due to a high viscosity of the lubricating oil, and the arm coupled to the selector plate is moved, and consequently, an erroneous engagement might be caused to the pocket plate and the notch plate that are in the non-engagement state. In order to avoid such an erroneous engagement, it might be possible to increase the elastic force of the return spring against the dragging torque, but this requires the actuator to generate a suction force great enough to overcome this elastic force, which might result in increase in dimension of the apparatus and deterioration of mountability to a vehicle body.

The present disclosure provides a selectable one-way clutch capable of preventing the above erroneous engagement without causing increase in dimension of the apparatus.

A selectable one-way clutch according to one aspect of the present disclosure includes: a pocket plate; a notch plate; an annular selector plate; an arm; and an actuator. The notch plate is so disposed as to face the pocket plate. The notch plate rotates coaxially with the pocket plate. The selector plate is disposed between the pocket plate and the notch plate. The selector plate is configured to rotate coaxially with the pocket plate and the notch plate at a predetermined angle so as to carry out switching between an engagement state to transmit torque between the pocket plate and the notch plate, and a non-engagement state to transmit no torque between the pocket plate and the notch plate. The arm is coupled to the selector plate so as to project toward an outer circumference of the selector plate. The actuator has an operating shaft. The operating shaft is configured to move the arm along a circumferential direction of the selector plate so as to move the arm to an engagement position at which the pocket plate and the notch plate come into an engagement state, and to a non-engagement position at which the pocket plate and the notch plate come into a non-engagement state. The operating shaft includes a slope portion inclined relative to a direction of a tangential line to the outer circumference of the selector plate. The slope portion is configured to move the selector plate to a position farther apart from the notch plate in a case where the arm is located at the non-engagement position than a position from the notch plate in a case where the arm is located at the engagement position.

According to the selectable one-way clutch of this aspect, if the selectable one-way clutch shifts to the non-engagement state, the slope portion formed in the operating shaft moves the selector plate to a position apart from the notch plate. Hence, a gap between the notch plate and the selector plate becomes greater, and thus a dragging torque acting on the selector plate due to the rotation of the notch plate is reduced, thereby preventing the erroneous engagement.

In the selectable one-way clutch according to the above aspect, the operating shaft may include two plate members so provided as to extend in a direction orthogonal to the direction of the tangential line to the outer circumference of the selector plate, and a connecting portion formed between the two plate members. The arm may be disposed between the two plate members. The operating shaft may be configured such that one of the two plate members comes into contact with the arm so as to move the arm to the engagement position or to the non-engagement position. The slope portion may be disposed on one end side of the connecting portion in the direction of the tangential line.

According to the selectable one-way clutch of this aspect, if the selectable one-way clutch shifts to the non-engagement state, it is possible to move the selector plate in a direction apart from the notch plate by the slope portion formed on the one end side of the connecting portion.

In the selectable one-way clutch according to the above aspect, the operating shaft may include two plate members so provided as to extend in a direction orthogonal to the direction of the tangential line to the outer circumference of the selector plate, and a connecting portion formed between the two plate members. The arm may be disposed between the two plate members. The operating shaft may be configured such that one of the two plate members comes into contact with the arm so as to move the arm to the engagement position or to the non-engagement position. The slope portion may be disposed to the entire connecting portion in the direction of the tangential line.

According to the selectable one-way clutch of this aspect, if the selectable one-way clutch shifts to the non-engagement state, it is possible to move the selector plate in a direction apart from the notch plate by the slope portion formed to the entire connecting portion.

In the selectable one-way clutch according to the above aspect, the operating shaft may include two plate members so provided as to extend in a direction orthogonal to the direction of the tangential line to the outer circumference of the selector plate, and a connecting portion formed between the two plate members. The arm may be disposed between the two plate members. The operating shaft may be configured such that one of the two plate members comes into contact with the arm so as to move the arm to the engagement position or to the non-engagement position. The slope portion may be disposed in a middle of the connecting portion in the direction of the tangential line. The connecting portion may be continued to the slope portion, and include a flat-shaped portion.

According to the selectable one-way clutch of this aspect, if the selectable one-way clutch shifts to the non-engagement state, it is possible to move the selector plate in the direction apart from the notch plate by the slope portion formed in the middle of the connecting portion.

In the selectable one-way clutch according to the above aspect, the arm may include an arm slope portion at a position facing the slope portion.

According to the selectable one-way clutch of this aspect, it is possible to increase a contact area between the arm and the slope portion, thereby smoothly moving the selector plate in the direction apart from the notch plate.

According to the selectable one-way clutch of the aforementioned solution, in the non-engagement state, it is possible to reduce the dragging torque acting on the selector plate due to the rotation of the notch plate, thereby preventing the erroneous engagement between the pocket plate and the notch plate without increasing the dimension of the apparatus.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a drawing schematically showing configurations of a plunger and an arm in the selectable one-way clutch according to the embodiment of the present disclosure;

FIG. 5A is a drawing schematically showing a state of the respective components while the selectable one-way clutch according to the embodiment of the present disclosure is in an engagement state, and showing the plunger and the arm;

FIG. 5B is a drawing schematically showing the state of the respective components while the selectable one-way clutch according to the embodiment of the present disclosure is in the engagement state, and showing a pocket plate, a selector plate, and a notch plate;

DETAILED DESCRIPTION OF EMBODIMENT

A selectable one-way clutch (referred to as an SOWC, hereinafter) according to an embodiment of the present disclosure will be described with reference to FIG. 1 to FIG. 9. The present disclosure is not limited to the following embodiment. Components in the following embodiment include components that are easily replaceable by those skilled in the art or substantially the same components. In drawings explained in the following descriptions, an x axis represents an axial direction of an operating shaft (plunger) of an actuator, a y axis represents a radial direction of a switching member (selector plate), and a z axis represents an axial line direction of the switching member (selector plate).

Figure 1:
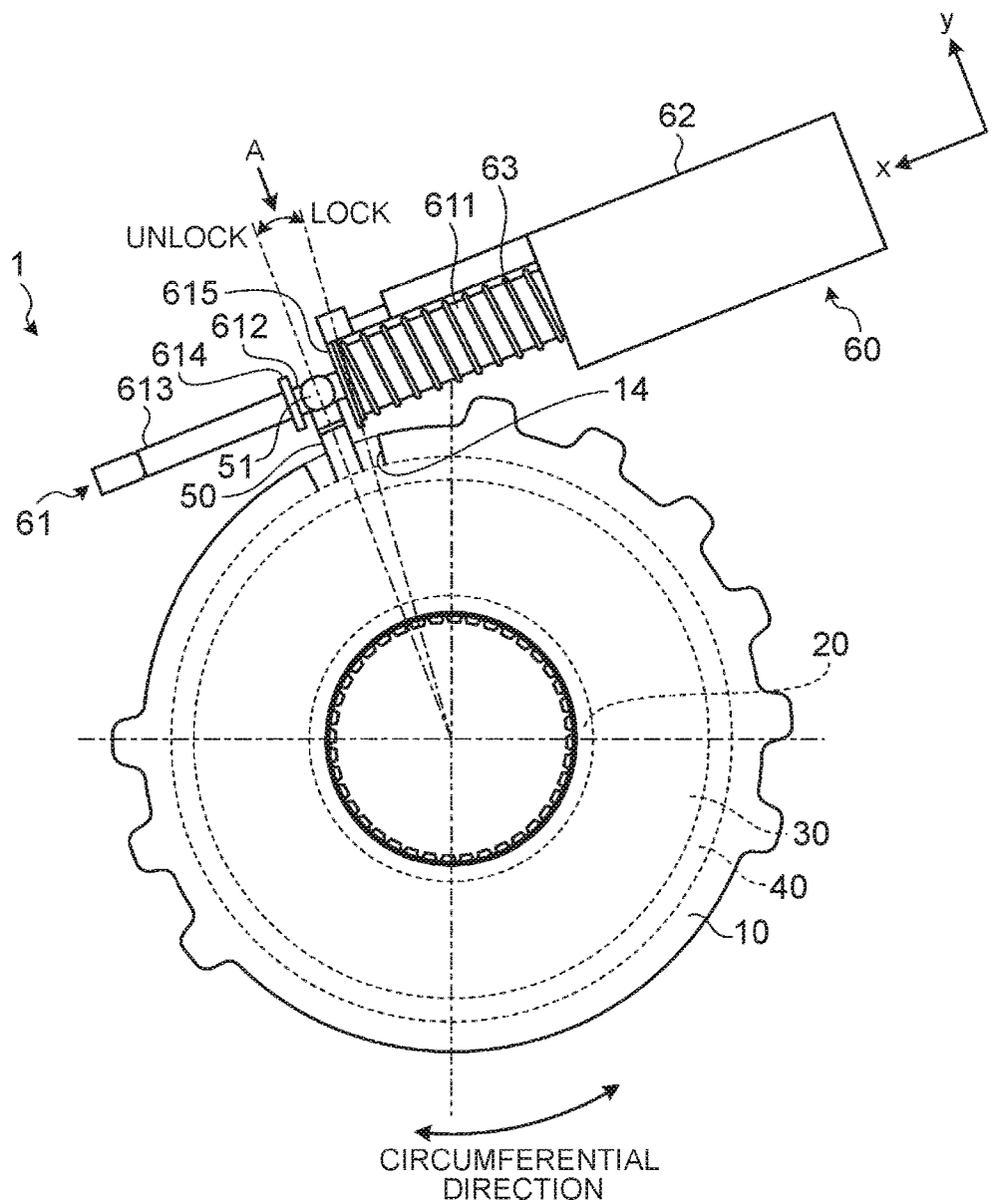
FIG. 1 is a drawing schematically showing a configuration of a selectable one-way clutch according to an embodiment of the present disclosure.

The SOWC1 is used in a power transmission mechanism such as a transmission in a vehicle, for example, and is configured to carry out switching between an engagement (lock) state and a non-engagement (unlock) state by rotating a switching member (selector plate) at a predetermined angle. As shown in FIG. 1, the SOWC1 includes a pocket plate 10, a notch plate 20, a selector plate 30, a snap ring 40, an arm 50, and an actuator 60. FIG. 1 is a drawing as viewed from an arrow B of FIG. 2 described later.

Figure 2:
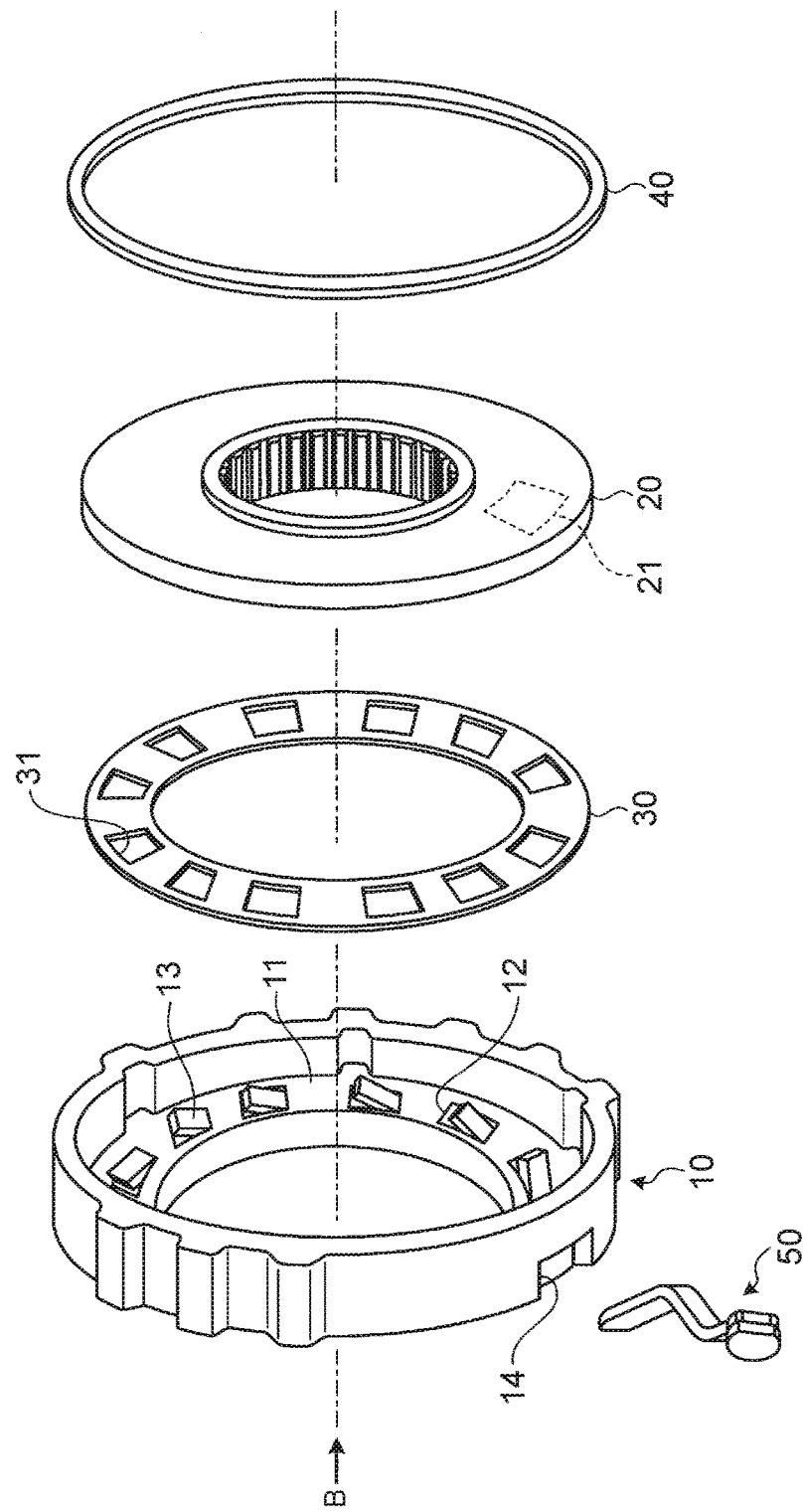
FIG. 2 is an exploded perspective view schematically showing the configuration of the selectable one-way clutch according to the embodiment of the present disclosure.

The pocket plate 10 is formed in a cylindrical shape as shown in FIG. 2, and a flange 11 in an annular shape (a hollow circular disk shape) is formed at one end in the axial line direction of the cylinder in a manner as to extend toward an inner circumference of the pocket plate 10. The selector plate 30 and the notch plate 20 are adjacently arranged in the flange 11 in this order, and then, the snap ring 40 is finally fixed to the flange 11, thereby integrally assembling the pocket plate 10, the selector plate 30, and the notch plate 20, as shown in FIG. 1. Although not shown in this drawing, a lubricating oil is supplied between the pocket plate 10 and the selector plate 30, and between the selector plate 30 and the notch plate 20, respectively. The pocket plate 10 is fixed to a not-shown case. The "axial line" denotes a line indicated by an alternate long and short dash line in FIG. 2.

As shown in FIG. 2, a cutout 14 is formed in an outer circumference of the pocket plate 10. As shown in FIG. 2, the arm 50 is inserted in the cutout 14 so as to couple the arm 50 to the selector plate 30.

A surface of the flange 11 that faces the selector plate 30 is provided with plural pockets 12 recessed in the axial line direction (plate thickness direction), as shown in FIG. 2, and struts (engagement pieces) 13 are housed in the pockets.

Each strut 13 is formed in a rectangular parallelepiped shape as shown in FIG. 2, and is disposed in the inside of each pocket 12. In the circumferential direction of the surface of the flange 11 that faces the selector plate 30, the state of each strut 13 is configured to be changeable between a stand-up state and a housing state: the stand-up state denotes a state in which one end of each strut 13 is housed in each pocket 12, and the other end thereof projects from this pocket 12 toward the notch plate 20 (a state as shown in FIG. 2), and the housing state denotes a state in which the one end and the other end of each strut 13 (i.e., the entire strut 13) are both housed in each pocket 12. Between the other end of each strut 13 and each pocket 12, there is disposed a not-shown spring that urges the other end of the strut 13 from the bottom surface of the pocket 12 toward the notch plate 20.

As shown in FIG. 2, the notch plate 20 is formed in an annular shape (a hollow circular disk shape) having an equal outer diameter to that of the flange 11 of the pocket plate 10. The notch plate 20 is so disposed as to face the pocket plate 10, and be rotatable coaxially with the pocket plate 10 around the axial line.

The notch plate 20 is provided in its surface located on the pocket plate 10 side (its surface facing the selector plate 30) with notches (engagement recesses) 21 that are recesses corresponding to the struts 13 at positions corresponding to the pockets 12 and the struts 13. Each notch 21 is a recess for accepting the other end of each strut 13 projecting through each window hole 31 of the selector plate 30 described later toward the notch plate 20, and an inner wall surface of each notch 21 facing the other end of each strut 13 is formed to be an engagement surface to be engaged with the other end of each strut 13. It should be noted that only a single notch 21 is illustrated in FIG. 2, but the same number of notches as those of the pockets 12 and the struts 13 are actually formed at positions corresponding to the pockets 12 and the struts 13.

As shown in FIG. 2, the selector plate (switching member) 30 is configured to be an annular shape (a hollow circular disk shape) having an outer diameter and an inner diameter that are equal to those of the flange 11 of the pocket plate 10. The selector plate 30 is disposed to face both the pocket plate 10 and the notch plate 20 so as to be rotatable around the axial line coaxially with the pocket plate 10 and the notch plate 20 at the predetermined angle. The selector plate 30 is provided at positions thereof corresponding to the pockets 12 and the struts 13 of the pocket plate 10 with the window holes 31 extending through the selector plate 30 in the axial line direction (plate thickness direction).

As shown in FIG. 2, the same number of window holes 31 as those of the pockets 12 and the struts 13 are formed at positions corresponding to the pockets 12 and the struts 13. If the positions of the window holes 31 coincide with the positions of the struts 13, the other ends of the struts 13 are pushed by the not-shown springs, and thus the other ends project through the window holes 31 toward the notch plate 20, and come into engagement with the notches 21.

On the other hand, if the positions of the window holes 31 deviate from the positions of the struts 13, the pockets 12 are blocked by portions of the selector plate 30 where no window holes 31 are formed, so that the struts 13 are pushed inside the pockets 12 by the selector plate 30 into the non-engagement state.

The aforementioned "engagement state" denotes a state in which the struts 13 of the pocket plate 10 are engaged with the notches 21 of the notch plate 20 so as to transmit torque between the pocket plate 10 and the notch plate 20. In this engagement state, the notch plate 20 is rotatable relative to the pocket plate 10 in only one direction, and is not rotatable relative thereto in the other direction.

On the other hand, the aforementioned "non-engagement state" denotes a state in which the engagement between the struts 13 of the pocket plate 10 and the notches 21 of the notch plate 20 are released so as to transmit no torque between the pocket plate 10 and the notch plate 20. In this non-engagement state, the notch plate 20 is rotatable relative to the pocket plate 10 in either of both directions.

As aforementioned, the snap ring 40 is used for integrally assembling the pocket plate 10, the selector plate 30, and the notch plate 20, and as shown in FIG. 2, the snap ring 40 is formed in an annular shape (a hollow circular disk shape) having an outer diameter equal to that of the flange 11 of the pocket plate 10.

The arm 50 is configured to transmit a driving force of the actuator 60 to the selector plate 30. As shown in FIG. 1, the arm 50 is inserted in the cutout 14 of the pocket plate 10 so as to be coupled to the selector plate 30. As shown in this drawing, a front end 51 of the arm 50 projects toward the outer circumference of the selector plate 30, and is disposed to a connecting portion 612 of a plunger 61 of the actuator 60 described later. As described later, the arm 50 is moved from one side to the other side, or from the other side to one side in the circumferential direction of the selector plate 30 (see FIG. 1) by the plunger 61 of the actuator 60 so as to rotate the selector plate 30 around the axial line.

The actuator 60 rotates the selector plate 30 at the predetermined angle via the arm 50. The actuator 60 is configured by a solenoid, for example, and includes the plunger 61, a casing 62, and a return spring 63, as shown in FIG. 1.

As shown in FIG. 1, the plunger (operating shaft) 61 includes a plunger body 611 in a cylindrical shape around which the return spring 63 is wound, the connecting portion 612 in a cylindrical shape to which the front end 51 of the arm 50 is disposed, and a front end portion 613 in the cylindrical shape; and disk-shaped collars 614, 615 are fixed to both ends of the connecting portion 612. The plunger 61 is configured to linearly move in a direction of a tangential line to the outer circumference of the selector plate 30 with an electromagnetic force generated by current supply.

The two collars 614, 615 (plate members) are so provided as to extend in a direction orthogonal to the direction of the tangential line to the outer circumference of the selector plate 30, and the connecting portion 612 is formed between the two collars 614, 615. The front end 51 of the arm 50 is disposed between the two collars 614, 615.

The plunger 61 moves the arm 50 along the circumferential direction of the selector plate 30 from one side to the other side in the circumferential direction so as to move the arm 50 to an engagement position at which the pocket plate 10 and the notch plate 20 come into the engagement state (see FIG. 5A described later). Alternatively, the plunger 61 moves the arm 50 along the circumferential direction of the selector plate 30 from the other side to the one side in the circumferential direction so as to move the arm 50 to an non-engagement position at which the pocket plate 10 and the notch plate 20 come into the non-engagement state (see FIG. 7A described later). The aforementioned "engagement position" denotes a position of the arm 50 at which the pocket plate 10 and the notch plate 20 come into the engagement state, and the aforementioned "non-engagement position" denotes a position of the arm 50 at which the pocket plate 10 and the notch plate 20 come into the non-engagement state.

More specifically, the plunger 61 brings one of the two collars 614, 615 to come into contact with the front end 51 of the arm 50 in accordance with the operation of the actuator 60 so as to move the arm 50 to the engagement position or to the non-engagement position. Specifically, the front end 51 of the arm 50 is pushed by one of the two collars 614, 615 so as to switch the position of the arm 50 to the engagement position or to the non-engagement position. With reference to the position of the plunger 61, the aforementioned "engagement position" is located closer to the collar 615 relative to the non-engagement position; and to the contrary, the aforementioned "non-engagement position" is located closer to the collar 614 relative to the engagement position.

The casing 62 is configured to accept the plunger 61. In order to put the SOWC1 into the engagement state, the casing 62 accepts the plunger 61 having been withdrawn with the electromagnetic force by current supply. On the other hand, in order to put the SOWC1 into the non-engagement state, the plunger 61 is brought to project toward the outside of the casing 62 by an elastic force of the return spring 63.

The return spring 63 applies the elastic force in a direction to bring the plunger 61 to project from the casing 62. The return spring 63 is wound around the outer circumference of the plunger body 611 between the casing 62 and the collar 615, as shown in FIG. 1. Through this, the return spring 63 urges the plunger 61 in a direction opposite to the direction of the electromagnetic force to withdraw the plunger 61. In the following descriptions, the direction of the tangential line to the outer circumference of the selector plate 30, the direction in which the plunger 61 is brought to project from the casing 62 in order to put the SOWC1 into the non-engagement state is defined as a "projecting direction", and the direction in which the plunger 61 is accepted in the casing 62 in order to put the SOWC1 into the engagement state is defined as an "accepting direction".

As aforementioned, in the SOWC of the related art, an erroneous engagement might be caused in an unintentional situation (during the non-engagement state), so that the SOWC is switched to the engagement state due to a dragging torque of the internal lubricating oil. For example, in a transmission including the SOWC, the state is usually in the non-engagement state when the engine is started up at cold time (the vehicle is in a stop and idling state), but the dragging torque caused by a shearing force of the lubricating oil collected in the SOWC might act and rotate the selector plate. In this case, the SOWC to be in the non-engagement state might come into the engagement state.

Figure 3:
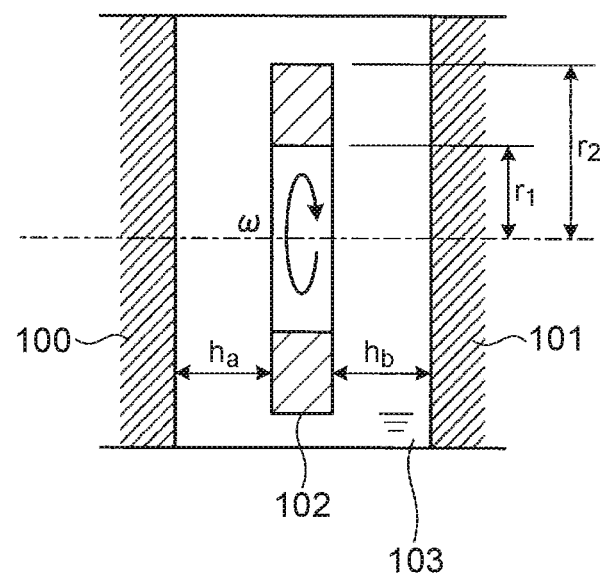
FIG. 3 is a drawing explaining a dragging torque acting on respective components of the selectable one-way clutch.

Generation mechanism of such a dragging torque can be explained by using FIG. 3 and the following Expression (1). In FIG. 3 and the following Expression (1), T represents a dragging torque [Nm], $h_a$ represents a distance from a rotor 102 to a first member 100 [m], $h_b$ represents a distance from the rotor 102 to a second member 101 [m], $r_1$ represents an inner radius of the rotor [m], $r_2$ represents an outer radius of the rotor [m], $r_m$ represents an average radius of the rotor [m], ω represents a rotation angle velocity of the rotor [rad/sec], and μ represents a viscosity of a lubricating oil 103 [Pa·s]. The average radius of the rotor denotes an average value of the inner radius $r_1$ and the outer radius $r_2$.

[Expression 1]

$$T = \pi\mu\omega r_m^2(r_2^2 - r_1^2)\left(\frac{1}{h_a} + \frac{1}{h_b}\right) \quad (1)$$

In the above Expression (1), for example, assuming that the distance $h_a$ from the rotor 102 to the first member 100 is constant, as the distance $h_b$ from the rotor 102 to the second member 101 becomes greater, the dragging torque T acting on the second member 101 due to the rotation of the rotor 102 becomes smaller. To the contrary, as the distance $h_b$ from the rotor 102 to the second member 101 becomes smaller, the dragging torque T acting on the second member 101 due to the rotation of the rotor 102 becomes greater.

For example, assuming that, in FIG. 3, the rotor 102 is the notch plate 20, the second member 101 is the selector plate 30, the first member 100 is a not-shown case to which the SOWC1 is fixed, respectively, if the notch plate 20 rotates in the lubricating oil, as shown in the above Expression (1), the dragging torque T is generated based on the inner radius $r_1$, the outer radius $r_2$, and the average radius $r_m$ of the notch plate 20, the distance $h_b$ from the notch plate 20 to the selector plate 30, the distance $h_a$ from the notch plate 20 to the not-shown case, the viscosity of the lubricating oil μ, and the rotation angle velocity of the notch plate 20 $\omega_m$. As shown in the above Expression (1), for example, as the distance $h_b$ from the notch plate 20 to the selector plate 30 becomes greater, the dragging torque T acting on the selector plate 30 due to the rotation of the notch plate 20 becomes smaller.

In consideration of the above generation mechanism of the dragging torque, in order to prevent the erroneous engagement due to the dragging torque, the SOWC1 according to the embodiment is configured such that the plunger 61 of the actuator 60 includes a slope portion 612a as shown in FIG. 4. FIG. 4 shows the actuator 60 and the arm 50 as viewed from an arrow A of FIG. 1. In FIG. 4, the arm 50 is schematically illustrated.

The slope portion 612a functions as mean that moves the arm 50 in the direction in which the selector plate 30 becomes apart from the notch plate 20. Specifically, in the direction of the tangential line to the outer circumference of the selector plate 30, the slope portion 612a is inclined in the direction in which the selector plate 30 becomes apart from the notch plate 20 as the slope portion 612a goes from the non-engagement position side toward the engagement position side of the arm 50.

The aforementioned "engagement position side" denotes a position located on the one end side (on the collar 615 side) of the connecting portion 612, and the "non-engagement position side" denotes a position located on the other end side (on the collar 614 side) of the connecting portion 612. Hence, the phrase: "from the non-engagement position side toward the engagement position side of the arm 50" means a direction from the other end side of the connecting portion 612 toward the one end side of the connecting portion 612, and more briefly, toward the accepting direction. The aforementioned "direction in which the selector plate 30 becomes apart from the notch plate 20" denotes the axial line direction (z axis) of the selector plate 30 that is the direction extending from the notch plate 20 toward the selector plate 30 (direction from the selector plate 30 toward the pocket plate 10). The aforementioned "engagement position side" denotes a position located on the one end side (on the collar 615 side) of the connecting portion 612, and the "non-engagement position side" denotes a position located on the other end side (on the collar 614 side) of the connecting portion 612.

As shown in FIG. 4, the slope portion 612*a* is formed at a position located on the one end side (on the collar 615 side in FIG. 4) of the connecting portion 612, that is, at a position located on the engagement position side with reference to the position of the arm 50. The slope portion 612*a* is formed at a position in the connecting portion 612 that comes into contact with the front end 51 of the arm 50 when the plunger 61 is brought to project in the projecting direction.

With the above-configured slope portion 612*a*, when the SOWC1 shifts from the engagement state to the non-engagement state, the arm 50 comes into contact with the slope portion 612*a* so that the arm 50 is moved along the slope of the slope portion 612*a* in the direction in which the selector plate 30 becomes apart from the notch plate 20. Specifically, when the SOWC1 shifts from the engagement state to the non-engagement state, the plunger 61 of the actuator 60 projects in the projecting direction, thereby displacing the position of the arm 50 in the direction in which the selector plate 30 becomes apart from the notch plate 20.

As shown in FIG. 4, if the slope portion 612*a* is viewed from one direction (from the arrow A direction of FIG. 1), the selector plate 30 is inclined at a predetermined angle in the direction in which the selector plate 30 comes apart from the notch plate 20, but the connecting portion 612 itself is in a cylindrical shape, and thus the slope portion 612*a* is formed around the entire circumferential surface of the connecting portion 612. Accordingly, if the slope portion 612*a* is sterically viewed, an outer diameter of an end on the one end side (on the collar 615 side in FIG. 4) of the connecting portion 612 becomes enlarged in the accepting direction. In other words, the end on the one end side (on the collar 615 side in FIG. 4) of the connecting portion 612 is formed in a reverse tapered shape of which diameter becomes enlarged toward the one end side of the connecting portion 612.

Figure 6:
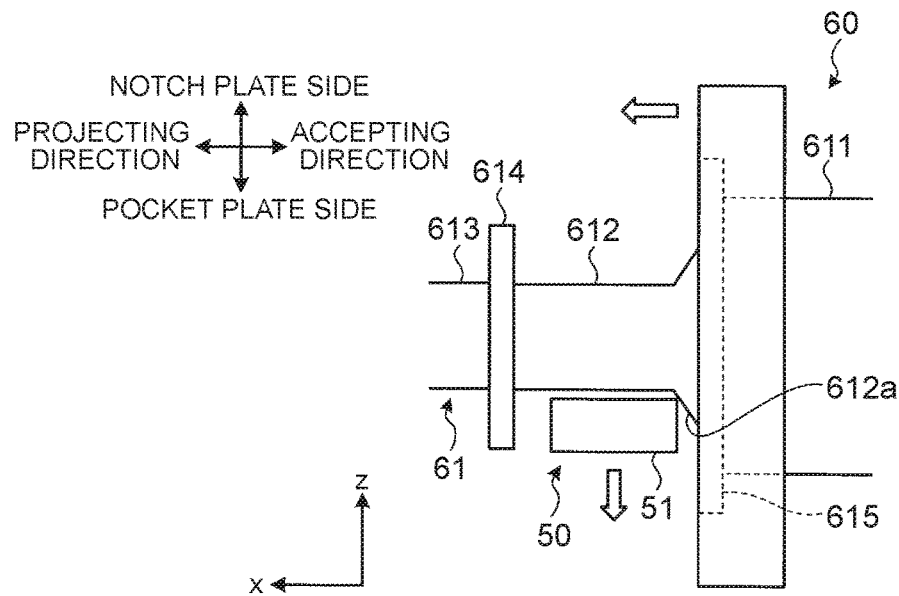
FIG. 6 is a drawing schematically showing a state of the plunger and the arm while the selectable one-way clutch according to the embodiment of the present disclosure is shifting from the engagement state to a non-engagement state.

An operation of each component of the SOWC1 when the SOWC1 shifts from the engagement state to the non-engagement state will be described with reference to FIG. 5 to FIG. 7, hereinafter. FIG. 5A, FIG. 6, and FIG. 7A are drawings showing the actuator 60 and the arm 50 as viewed from the arrow A direction of FIG. 1. In the drawings, the arm 50 is schematically illustrated.

If the SOWC1 is in the engagement state, as shown in FIG. 5A, the front end 51 of the arm 50 is in contact with the collar 614 on the other end side of the connecting portion 612, and thus the pocket plate 10 is in engagement with the notch plate 20.

In such an engagement state, as shown in FIG. 5B, a gap d11 between the pocket plate 10 and the selector plate 30 is great enough to supply the lubricating oil among the components from the axial center by centrifugal force.

When the SOWC1 shifts from the engagement state to the non-engagement state, as shown in FIG. 6, the plunger 61 projects in the projecting direction. Through this, the arm 50 is moved from the other side to the one side in the circumferential direction of the selector plate 30. In this case, the respective positions of the pocket plate 10, the notch plate 20, and the selector plate 30 are the same as those of FIG. 5B.

Figure 7A:
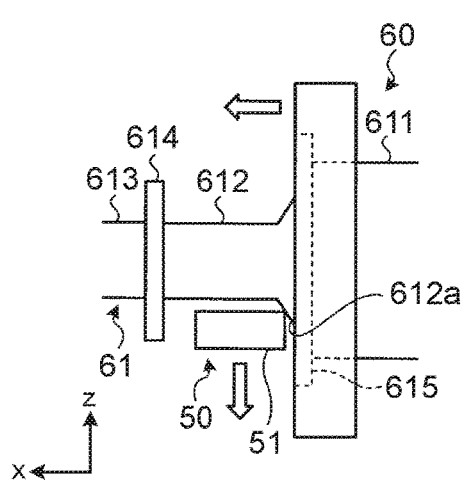
FIG. 7A is a drawing schematically showing a state of the respective components while the selectable one-way clutch according to the embodiment of the present disclosure is in the non-engagement state, and showing the plunger and the arm.

When the SOWC1 comes into the non-engagement state from the engagement state, as shown in FIG. 7A, the plunger 61 further projects in the projecting direction. Through this, the arm 50 is moved from the other side to the one side in the circumferential direction of the selector plate 30, so that a corner of the front end 51 of the arm 50 is in contact with the slope portion 612*a*. Through this operation of the slope portion 612*a*, the arm 50 is moved along the slope of the slope portion 612*a* in the direction in which the selector plate 30 becomes apart from the notch plate 20.

Figure 7B:
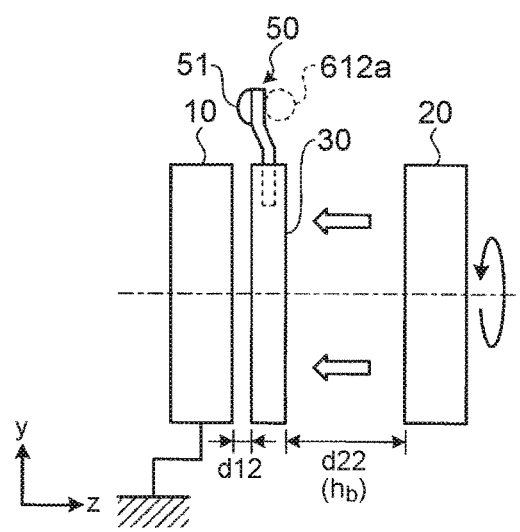
FIG. 7B is a drawing schematically showing the state of the respective components while the selectable one-way clutch according to the embodiment of the present disclosure is in the non-engagement state, and showing the pocket plate, the selector plate, and the notch plate.

Through this, as shown in FIG. 7B, the selector plate 30 is pushed toward the pocket plate 10 via the arm 50, and thus a gap d12 between the pocket plate 10 and the selector plate 30 becomes smaller than the gap d11 therebetween in the engagement state (see FIG. 5B) (d12<d11), and a gap d22 between the selector plate 30 and the notch plate 20 becomes greater than a gap d21 therebetween in the engagement state (d22>d21).

In the non-engagement state, as shown in FIG. 7B, for example, the notch plate 20 is rotated synchronously with the rotation of the engine, and thus the dragging torque is generated, which might cause erroneous rotation of the selector plate 30. However, in the non-engagement state, as shown in FIG. 7B, the gap d22 between the notch plate 20 and the selector plate 30 becomes greater than the gap d21 therebetween in the engagement state (see FIG. 5B). Accordingly, assuming that, in FIG. 3, the rotor is the notch plate 20, and the second member is the selector plate 30, as shown in the above Expression (1), the dragging torque acting between the notch plate 20 and the selector plate 30 becomes smaller than that in the engagement state.

In addition, in the non-engagement state, as shown in FIG. 7B, the gap d12 between the pocket plate 10 and the selector plate 30 becomes smaller than the gap d11 therebetween in the engagement state (see FIG. 5B). Hence, assuming that, in FIG. 3, the rotor is the selector plate 30, and the first member is the pocket plate 10, as shown in the above Expression (1), the dragging torque acting between the selector plate 30 and the pocket plate 10 becomes greater than that in the engagement state. Accordingly, this increase in dragging torque becomes resistance against the dragging torque generated by the rotation of the notch plate 20, thus working as a force to suppress the erroneous rotation of the selector plate 30.

As aforementioned, with the operation of the slope portion 612*a* of the plunger 61, the SOWC1 can generate a force to suppress the erroneous rotation of the selector plate 30 by setting the gap between the pocket plate 10 and the selector plate 30 to be smaller as well as by setting the gap between the selector plate 30 and the notch plate 20 to be greater.

If the SOWC1 shifts from the non-engagement state to the engagement state, that is, from the state as shown in FIG. 7B to the state as shown in FIG. 5B, the arm 50 is moved along the circumferential direction of the selector plate 30 from the one side to the other side in this circumferential direction. As the arm 50 shifts from the non-engagement position to the engagement position, more lubricating oil is supplied between the pocket plate 10 and the selector plate 30, and the oil amount between both plates becomes increased, thus the gap between the pocket plate 10 and the selector plate 30 becomes increased.

If the selector plate 30 is rotated into the engagement state while the gap between the selector plate 30 and the pocket plate 10 is small, or both plates are in contact with each other, the selector plate 30 slides against the pocket plate 10, which might cause abrasion or damages to the plates. To the contrary, as the SOWC1 shifts from the non-engagement state to the engagement state, the gap between the pocket plate 10 and the selector plate 30 becomes greater, thus the above abrasion and damages can be prevented.

When the SOWC1 having the above configuration shifts to the non-engagement state, the slope portion 612a formed in the plunger 61 comes into contact with the arm 50 so as to move the arm 50 in the direction in which the selector plate 30 becomes apart from the pocket plate 10. Consequently, the selector plate 30 coupled to the arm 50 moves in the direction apart from the notch plate 20, and thus the gap between the notch plate 20 and the selector plate 30 becomes greater, thereby the dragging torque acting on the selector plate 30 is reduced due to the rotation of the notch plate 20. Hence, according to the SOWC1, in the non-engagement state, it is possible to reduce the dragging torque acting on the selector plate 30 due to the rotation of the notch plate 20, thus the erroneous engagement between the pocket plate 10 and the notch plate 20 can be prevented without increasing the dimension of the apparatus.

As aforementioned, the selectable one-way clutch according to the present disclosure has been more specifically explained by describing the embodiment of the present disclosure. However, the spirit of the present disclosure should not be limited to the above descriptions, but rather be construed broadly within the spirit and scope of the claims. It is needless to mention that various changes and modifications, and others made based on these descriptions may be included in the spirit of the present disclosure.

For example, in FIG. 4, as the means that moves the arm 50 in the direction in which the selector plate 30 becomes apart from the pocket plate 10, there has been explained the configuration of forming the slope portion 612a in the connecting portion 612 of the plunger 61, that is, the configuration of enlarging the outer diameter of the end on the one end side of the connecting portion 612 (on the collar 615 side in FIG. 4) in the accepting direction (toward the engagement position side), or forming the slope portion 612a in a reverse tapered shape having an outer diameter enlarged toward the one end side of the connecting portion 612; but the configuration of this means is not limited to the configuration as shown in FIG. 4 as far as the arm 50 is moved in the direction in which the selector plate 30 becomes apart from the pocket plate 10.

Figure 8:
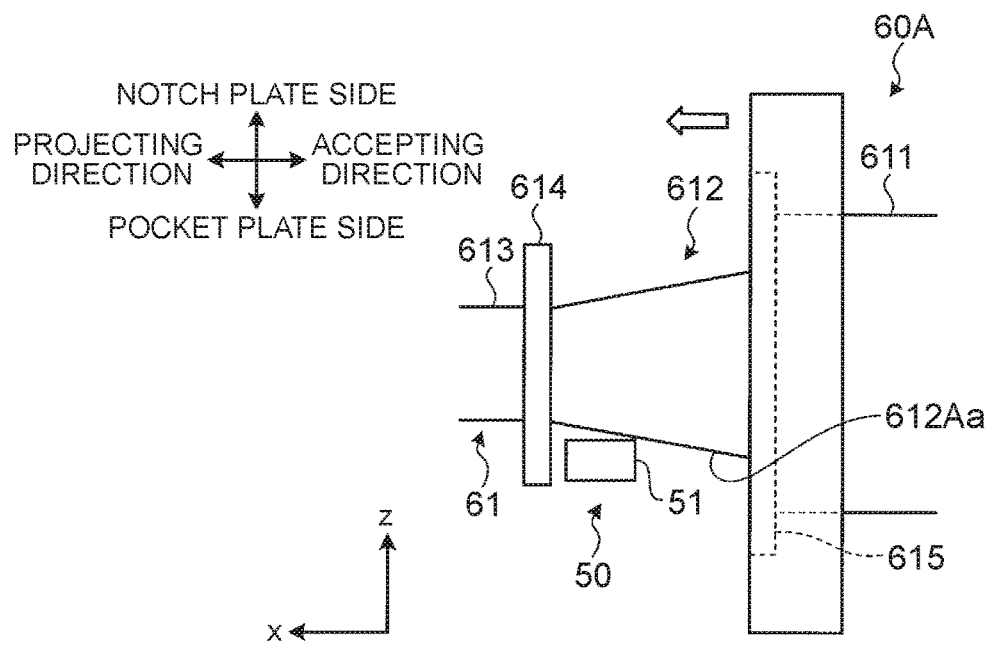
FIG. 8 is a drawing showing another example of the actuator included in the selectable one-way clutch according to the embodiment of the present disclosure.

For example, as with an actuator 60A as shown in FIG. 8, a slope portion 612Aa may be formed to the entire connecting portion 612. The actuator 60A as shown in FIG. 8 includes the connecting portion 612 of which entire outer diameter is enlarged toward the accepting direction, that is, the entire connecting portion 612 is formed in a reverse tapered shape.

Figure 9:
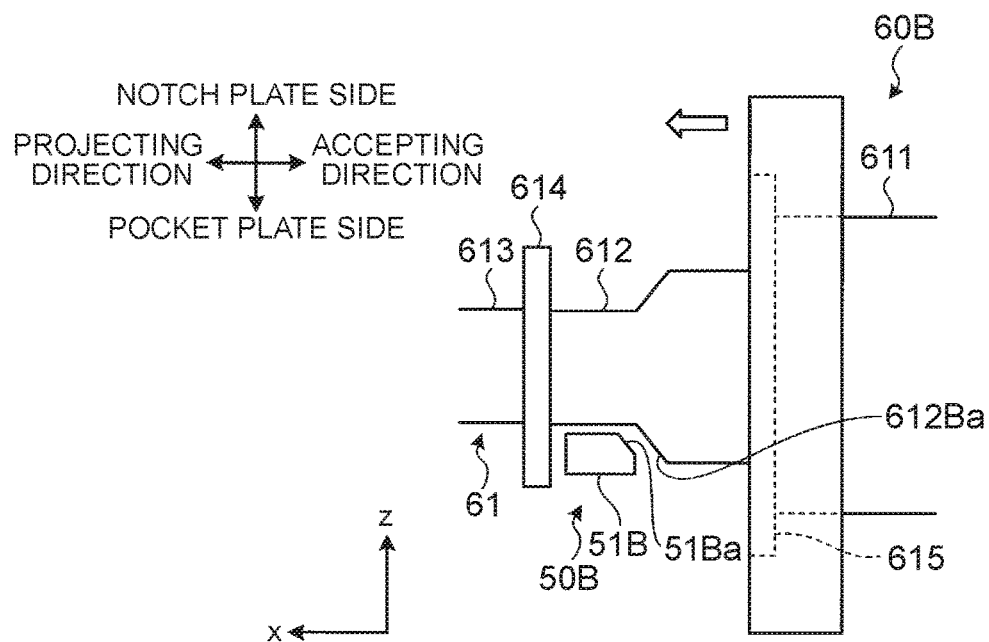
FIG. 9 is a drawing showing another example of the actuator included in the selectable one-way clutch according to the embodiment of the present disclosure.

For example, as with an actuator 60B as shown in FIG. 9, a slope portion 612Ba may be formed at a position apart from the one end side of the connecting portion 612 (from the collar 615 side in FIG. 9). The actuator 60B in FIG. 9 includes a slope portion 612Ba formed in the middle of the connecting portion 612. The connecting portion 612 of the actuator 60B is formed to be continued to the slope portion 612Ba, and have a flat shape on the engagement position side (on the one end side of the connecting portion 612, on the collar 615 side). Specifically, the connecting portion 612 of the actuator 60B has a constant outer diameter in a predetermined distance from the collar 614, and the outer diameter is enlarged at the position of the slope portion 612Ba toward the accepting direction, and becomes constant again after the slope portion 612Ba to the collar 615.

As with the actuator 60B in FIG. 9, an arm slope portion 51Ba may be formed in a front end 51B of an arm 50B at a position that faces the slope portion 612Ba. By providing this arm slope portion 51Ba, it is possible to increase a contact area between the front end 51B of the arm 50B and the slope portion 612Ba, thereby smoothly moving the arm 50 in the direction in which the selector plate 30 becomes apart from the pocket plate 10.

In the above descriptions, the connecting portion 612 of the plunger 61 is assumed to have a cylindrical shape, but the shape of the connecting portion 612 may be a prism shape, such as a rectangular column, and the slope portion 612a may be formed in one surface of the connecting portion 612 in such a prism shape.

What is claimed is:

1. A selectable one-way clutch comprising:
   a pocket plate;
   a notch plate so disposed as to face the pocket plate, the notch plate rotating coaxially with the pocket plate;
   a selector plate in a disk shape, the selector plate disposed between the pocket plate and the notch plate, the selector plate configured to rotate coaxially with the pocket plate and the notch plate at a predetermined angle so as to carry out switching between an engagement state to transmit torque between the pocket plate and the notch plate, and a non-engagement state to transmit no torque between the pocket plate and the notch plate;
   an arm coupled to the selector plate so as to project toward an outer circumference of the selector plate; and
   an actuator including an operating shaft, the operating shaft configured to move the arm along a circumferential direction of the selector plate so as to move the arm to an engagement position at which the pocket plate and the notch plate come into an engagement state, and to a non-engagement position at which the pocket plate and the notch plate come into a non-engagement state, the operating shaft including a slope portion inclined relative to a direction of a tangential line to the outer circumference of the selector plate, the slope portion configured to move the selector plate to a position farther apart from the notch plate in a case where the arm is located at the non-engagement position than a position from the notch plate in the case where the arm is located at the engagement position
   wherein the slope portion is arranged at a connecting portion that comes into contact with the arm when the plunger is brought to project in the projecting direction, and
   wherein when the pocket plate and the notch plate come into the non-engagement state from the engagement state, the arm comes into contact with the slope portion and the arm is moved along the slope of the slope portion in the direction in which the selector plate becomes apart from the notch plate.

2. The selectable one-way clutch according to claim 1, wherein
   the operating shaft includes: two plate members so provided as to each extend in a direction orthogonal to the direction of the tangential line to the outer circumference of the selector plate; and a connecting portion formed between the two plate members,
   the arm is disposed between the two plate members,
   the operating shaft is configured such that one of the two plate members comes into contact with the arm so as to move the arm to the engagement position or to the non-engagement position, and
   the slope portion is disposed on one end side of the connecting portion in the direction of the tangential line.

3. The selectable one-way clutch according to claim 1, wherein
the operating shaft includes: two plate members so provided as to each extend in a direction orthogonal to the direction of the tangential line to the outer circumference of the selector plate; and a connecting portion formed between the two plate members,
the arm is disposed between the two plate members,
the operating shaft is configured such that one of the two plate members comes into contact with the arm so as to move the arm to the engagement position or to the non-engagement position, and
the slope portion is disposed to the entire connecting portion in the direction of the tangential line.

4. The selectable one-way clutch according to claim 1, wherein
the operating shaft includes: two plate members so provided as to each extend in a direction orthogonal to the direction of the tangential line to the outer circumference of the selector plate; and a connecting portion formed between the two plate members,
the arm is disposed between the two plate members,
the operating shaft is configured such that one of the two plate members comes into contact with the arm so as to move the arm to the engagement position or to the non-engagement position,
the slope portion is disposed in a middle of the connecting portion in the direction of the tangential line, and
the connecting portion is continued to the slope portion, and includes a flat-shaped portion.

5. The selectable one-way clutch according to claim 1, wherein
the arm includes an arm slope portion at a position facing the slope portion.

6. A selectable one-way clutch comprising:
a pocket plate;
a notch plate so disposed as to face the pocket plate, the notch plate rotating coaxially with the pocket plate;
a selector plate in a disk shape, the selector plate disposed between the pocket plate and the notch plate, the selector plate configured to rotate coaxially with the pocket plate and the notch plate at a predetermined angle so as to carry out switching between an engagement state to transmit torque between the pocket plate and the notch plate, and a non-engagement state to transmit no torque between the pocket plate and the notch plate;
an arm coupled to the selector plate so as to project toward an outer circumference of the selector plate; and
an actuator including an operating shaft, the operating shaft configured to move the arm along a circumferential direction of the selector plate so as to move the arm to an engagement position at which the pocket plate and the notch plate come into an engagement state, and to a non-engagement position at which the pocket plate and the notch plate come into a non-engagement state, the operating shaft including a slope portion inclined relative to a direction of a tangential line to the outer circumference of the selector plate, the slope portion configured to move the selector plate to a position farther apart from the notch plate in a case where the arm is located at the non-engagement position than a position from the notch plate in a case where the arm is located at the engagement position,
wherein the arm includes an arm slope portion at a position facing the slope portion.

* * * * *